United States Patent [19]

Hedel

[11] 4,195,333

[45] Mar. 25, 1980

[54] DC TO DC VOLTAGE CONVERTER

[75] Inventor: Kurt K. Hedel, Utica, N.Y.

[73] Assignee: General Electric Company, Utica, N.Y.

[21] Appl. No.: 910,330

[22] Filed: May 30, 1978

[51] Int. Cl.² .......................................... H02M 3/335
[52] U.S. Cl. ...................................... 363/21; 363/46; 363/50; 363/79; 363/65
[58] Field of Search .................................. 363/20–21, 363/40–43, 53, 56, 65, 78–80, 95, 97, 24–26, 44–48, 131, 133–134; 307/82–83

[56] References Cited

U.S. PATENT DOCUMENTS

| 3,099,787 | 7/1963 | Elovic | 363/134 |
| 3,171,078 | 2/1965 | Keener | 363/48 |
| 3,221,244 | 11/1965 | Biringer | 323/56 |
| 3,873,903 | 3/1975 | Koetsch et al. | 363/25 |
| 4,005,352 | 1/1977 | Kugler et al. | 363/26 |
| 4,062,057 | 12/1977 | Perkins et al. | 363/25 X |

OTHER PUBLICATIONS

A. Winet and M. Cavelti, "Switched Mode Power Supplies and DC/DC Converters," Hasler Review, vol. 9, No. 4, pp. 91–96.

Primary Examiner—William M. Shoop
Assistant Examiner—Peter S. Wong

[57] ABSTRACT

The DC to DC voltage converter consists of two single ended pulse width modulated converters with a single voltage control loop, a power balancing control loop and overload protection circuitry. The converters which share the same input and output filters are staggered in time so as to reduce the pulse current in the input filter capacitor and the ripple current in the output filter capacitor thereby permitting a reduction in the size of the input and output filters.

9 Claims, 6 Drawing Figures

(a)

(b)

(c)

(d)

(e)

(f)

(g)

(h)

(j)

(a)

(b)

(c)

(d)

(e)

(a)

(b)

(c)

(d)

(e)

DC TO DC VOLTAGE CONVERTER

BACKGROUND OF THE INVENTION

1. Field of the Invention

The invention relates to DC voltage converters which convert a direct current power input at one voltage level to a direct current power output at a different voltage level, and more particularly to the application of staggered mode switching to single-ended, pulse-width-modulated, DC to DC converters, thereby, combining the benefits of a transformer coupled supply with the benefits of staggered mode switching.

2. Description of Prior Art

The use of staggered mode switching to reduce the RMS value of the AC currents and voltages inherent in switching regulators and the resulting improvement in output ripple voltage and filter size and cost have been disclosed in the art.

Staggered mode switching has been applied in the prior art with one or more of the following disadvantages:

1. No DC isolation between the input and output.
2. A restriction in the nominal voltage transformation ratio in order to receive the maximum benefit obtainable from staggered mode operation.
3. Current steps in the output filter capacitor require the capacitor to have a very low impedance over a wide frequency range to control the ripple and switching spikes in the output voltage.
4. A circuit topology that does not reduce the RMS AC currents and voltages to the degree that it is achievable through the staggered mode operation of two single ended converters.
5. More than two power transistors are required.
6. More than one voltage control is required.
7. More than one overload protection circuit is required.
8. Accurate balance of the power and stress levels between the converters or power channels cannot be achieved.
9. Power transformer windings are operated at a lower duty cycle thus adding to their size and weight.
10. High pulse current in the output capacitor over most of the input voltage range greatly increases the size, weight and cost of the output filter capacitor.
11. The converter must be protected against simultaneous conduction of the power switching transistors.
12. A blocking capacitor or some other means to control the dc flux imbalance in the power transformer is required since the transformer cannot be allowed to saturate at either end of the cycle.

Accordingly, it is an object of the present invention to provide a DC to DC converter that has a combination of characteristics which will enable it to overcome the aforementioned disadvantages and which make it particularly well suited to the requirements of avionic equipment. Such avionic equipment requirements which this novel invention can meet include small size and weight, the utilization of low profile components so as to be compatible with standard hardware module packaging, a two:one input voltage range, high efficiency, operability over a wide component temperature range (minus 55° C. to ±125° C.) and high reliability.

SUMMARY OF THE INVENTION

The foregoing objects are achieved according to this invention through the utilization of a closed loop system which controls the switching of two single ended, pulse width modulated DC to DC converters in such a manner as to minimize the input ripple current and output ripple voltage.

The DC input voltage is first fed through an input filter connected by way of a switching means to each of two single ended DC to DC converters which are in turn connected to an output filter. As the input voltage changes from its nominal value, the control means adjusts the switching means in such a manner as to keep the output voltage at a constant DC level while minimizing any AC components.

A power balancing means is employed to ensure that the load is shared equally by the two single ended converters. This is achieved by allowing the controller to make a slight change in the duty cycle of one single ended converter with respect to the other. An overload protection means is included to limit the current flowing in the circuit elements and the distribution system to a safe level during an overload or short circuit condition.

BRIEF DESCRIPTION OF THE DRAWINGS

Various other objects, features and attendant advantages of the present invention will be more fully appreciated from the following detailed description in connection with the accompanied drawings.

DESCRIPTION OF THE PREFERRED EMBODIMENT

Figure 1:
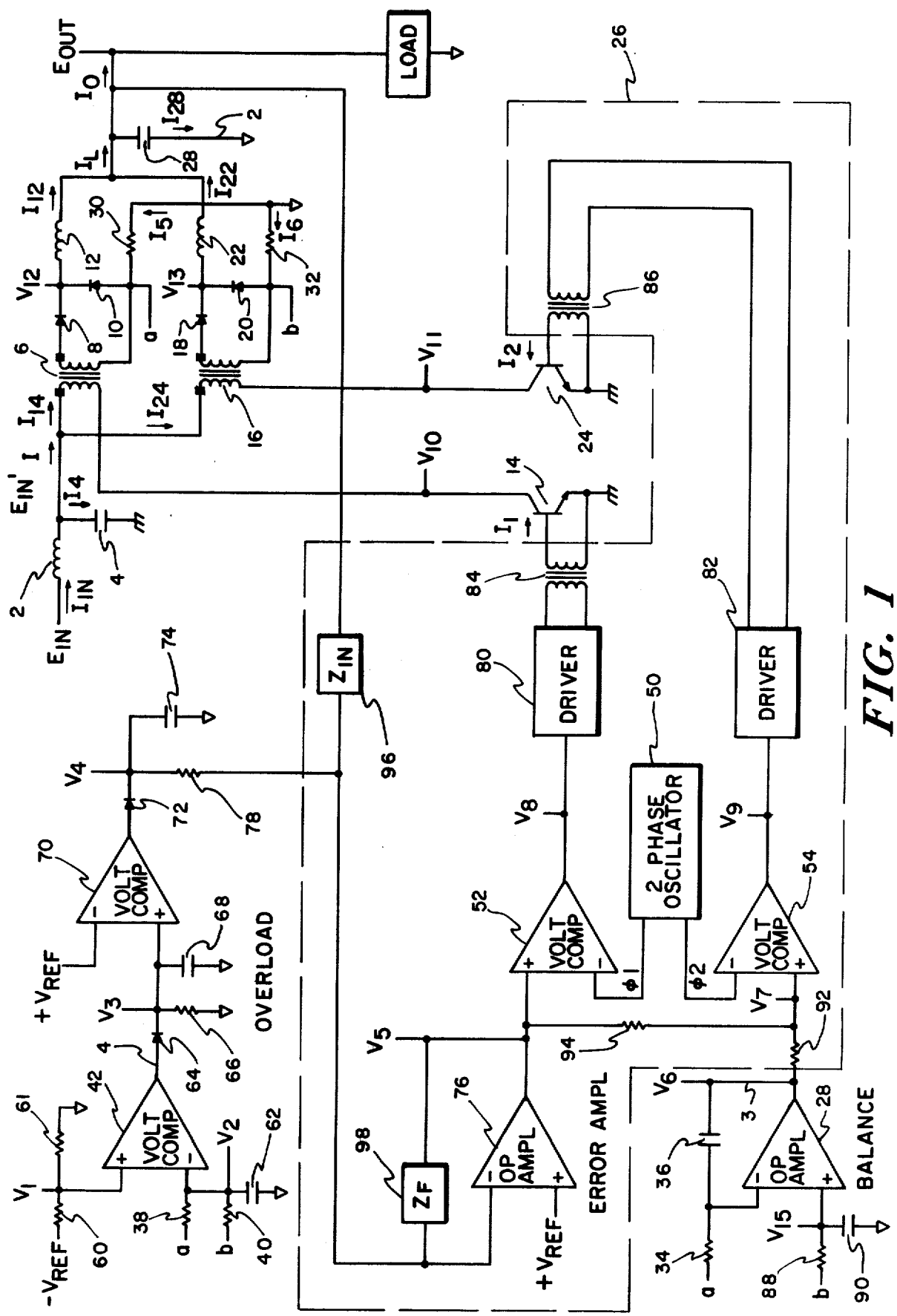
FIG. 1 is a schematic diagram of an embodiment of a staggered mode DC to DC converter according to the invention.

A schematic diagram of the staggered mode DC to DC voltage converter is shown in FIG. 1. Such an embodiment for a single output power supply in the 200 to 1000 watt range, such as a 60 ampere, 5 volt logic supply offers advantages that are significant in many military and commercial applications. The invention will be described with reference to its use in a military environment which poses strict requirements upon its operation e.g., operability within a temperature range from −55° C. to 125° C.

In the avionic environment, the available 3 phase, 400 Hertz, 115/200 VAC can be passed through a bridge rectifier in order to obtain a DC nominal input voltage, $E_{IN}$ of 270 volts when the input AC voltage is at its nominal value of 113 VAC.

Referring more particularly to FIG. 1, the input DC voltage $E_{IN}$ is connected across the input filter consisting of a first inductor 2 and a first capacitor 4. After the input DC voltage has been filtered in this manner, it serves as the source voltage for each of the two single ended converters. Notice that two ground designations are shown in FIG. 1 in order to demonstrate DC isolation can be achieved between the input and output voltages. It should be noted that the invention is also operable with the designated grounds in common with one another.

The first single ended DC to DC converter is composed of a single ended power transformer 6, diodes 8 and 10, inductor 12, transistor 14 and resistor 30. Transistor 14 functions as a switching means to apply $E_{IN}$ across the primary windings of transformer 6. Less than 1% of $E_{OUT}$ is dropped across resistor 30. The transformer polarity dots shown in FIG. 1 correspond to the start of each winding. Inductor 12 serves as a current averaging means.

The second single ended DC to DC converter consists of a single ended power transformer 16, diodes 18 and 20, inductor 22, transistor 24 and resistor 32. Transistor 24 functions in a complementary fashion with respect to transistor 14, as it acts as a switching means to send current through the primary windings of transformer 16. Inductor 22 serves as a current averaging means.

Controller 26 acts as a control means which operates transistors 14 and 24 in an out of phase fashion thereby alternately driving transistors 14 and 24 in conducting and nonconducting states, respectively. Under normal operating conditions controller 26 will be turning each transistor 14 and 24 on and off 50% of the time. This will cause each of the two single ended converters to have a 50% duty cycle. Under these conditions since the corresponding components of each single ended converter are identical, when the input voltage $E_{IN}$ and output voltage, $E_{OUT}$, are set at their nominal values, the ripple current passing through inductor 12, $I_{12}$, will be equal and of opposite polarity to the ripple current passing through inductor 22, $I_{22}$. The current $I_L$ being the sum of currents $I_{12}$ and $I_{22}$, is in the ideal case a pure DC current because the equal and opposite ripple currents have effectively cancelled each other out.

The output filter capacitor 28 is common to both single ended converters. If the AC component of $I_{12}$ and $I_{22}$ do not completely cancel, there will be an AC component to $I_L$ which is shunted to ground by capacitor 28.

The voltage across capacitor 28, the output voltage $E_{OUT}$ is fed back to controller 26, closing the voltage control, servo loop.

Figure 2:
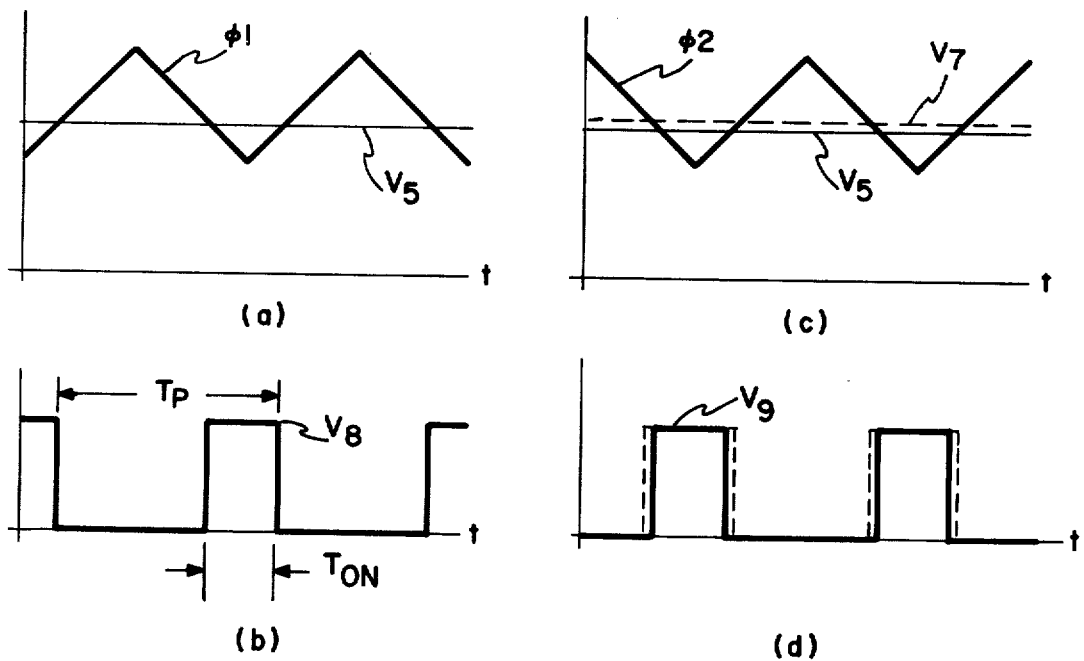
FIG. 2 illustrates some of the voltage waveforms present in the controller portion of the DC to DC converter.

The control means, controller 26, contain error amplifier 76 which compares the output voltage, $E_{OUT}$, with a positive reference voltage, $V_{REF}$. Impedance networks 96 and 98 control the frequency-gain response of the error amplifier and are used to optimize the characteristics of the output voltage control servo. $V_5$ is the amplified voltage difference between $E_{OUT}$ and $V_{REF}$. Controller 26 also contains a two phase oscillator 50 which generates two triangular waveforms ($\phi 1$ and $\phi 2$) that are 180° out of phase from one another (see FIGS. 2a and 2c). FIG. 2a represents waveforms of the voltages at the input terminals of voltage comparator 52 and FIG. 2b represents the output voltage, $V_8$, of voltage comparator 52. Notice that when the $V_5$ waveform exceeds the $\phi 1$ waveform, the output waveform $V_8$ experiences a positive state. This time duration of this positive state is denoted by $T_{ON}$ and the total period of the triangular waveform is denoted by $T_P$. Voltage comparator 54 has the input voltages of $V_7$ and $\phi 2$, and an output voltage of $V_9$. If the voltage at $V_6$ of FIG. 1 is equal to the voltage at $V_5$, then $V_5$ will equal $V_7$ and the waveforms at $V_8$ and $V_9$ will be identical to each other except for a displacement in time equal to 180° or one-half the period. If, however, the voltage at $V_6$ is more positive than that at $V_5$ then $V_7$ will be more positive than $V_5$ as shown by the dashed line in FIG. 2c. This will result in a new waveform having a higher duty cycle (ratio of $T_{ON}$ to $T_P$) for $V_9$ as shown in the dashed waveform of FIG. 2d. Transistors 14 and 24 are turned "on" during the high states of $V_8$ and $V_9$ respectively. Accordingly, the average value of $V_{13}$ will be higher than the average value of $V_{12}$ if the duty cycle of $V_9$ is greater than the duty cycle of $V_8$. This will cause $I_{22}$ to exceed $I_{12}$ and $I_6$ to exceed $I_5$, resulting in a negative sample voltage at "b" greater (in magnitude) than that at "a". If the voltage at "b" exceeds that at "a", $V_6$ will be driven in the negative direction, reducing the duty cycle of $V_9$ with respect to $V_8$. Equilibrium of the balance control loop will be achieved when $I_5$ equals $I_6$. Notice that the pulse train at $V_8$ remains perfectly interlaced with the pulse train at $V_9$, regardless of the voltage at $V_6$. This is necessary to minimize the AC currents flowing through capacitors 4 and 28 thereby minimizing the output ripple voltage, the dissipation (due to equivalent series resistance) in capacitors 4 and 28, and the conducted noise current on the input power line. Current balance ($I_5$ equals $I_6$ and $I_{12}$ equals $I_{22}$) is necessary to balance the stress levels in the circuit components and also minimize the RMS current that must be filtered by the input filter.

Drivers 80 and 82 function to provide the proper magnitude of base currents to transistors 14 and 24, respectively, when the waveforms at $V_8$ and $V_9$, respectively, are at their high states. Transformer coupling provided by transformers 84 and 86 is utilized between each driver and each transistor in order to match impedances for the most efficient base drive possible. Another advantage of transformer coupling between each driver and transistor is that it provides dc isolation at this point in the circuit.

Resistors 92 and 94 serve as an attenuator of variations in $V_6$. It is necessary to make $V_7$ slightly different than $V_5$ in order to accommodate imbalances that appear elsewhere in the circuit e.g., differences in storage times between transistors 14 and 24. In order to vary $V_7$ with respect to $V_5$, we need to couple a small amount of the voltage developed at the output of the balance circuit, $V_6$ and have it appear at $V_7$. The voltage divider comprising resistors 92 and 94 couples a portion of that balance correcting voltage, $V_6$, onto $V_7$. The voltage, $V_7$, is different from the voltage $V_5$ in such a manner as to take up all the other imbalance problems that exist in the circuit.

Figure 3:
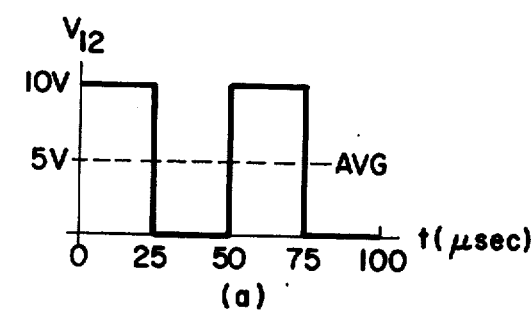
FIG. 3 illustrates some of the current and voltage waveforms present in the staggered mode DC to DC converter when $E_{IN}$ and $E_{OUT}$ are set at their nominal values.
Figure 3:
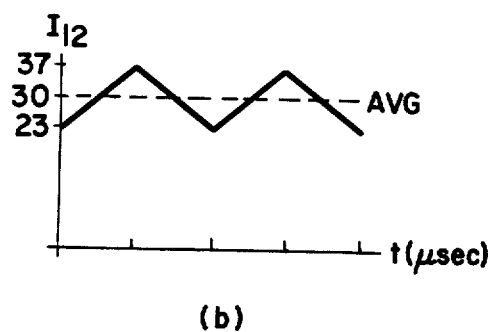
Figure 3:
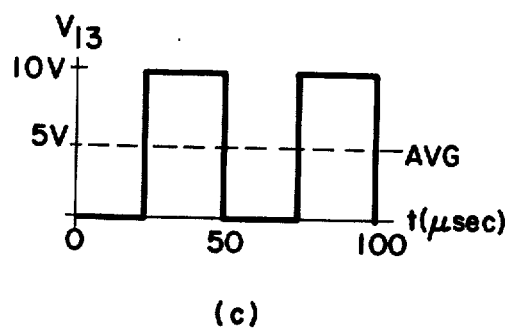
Figure 3:
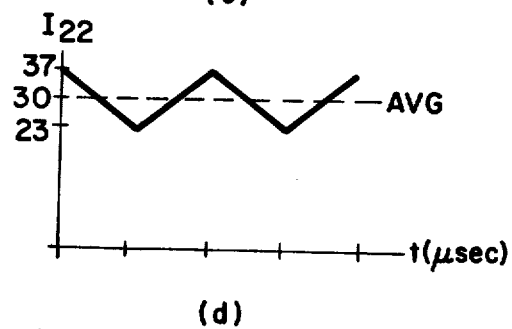
Figure 3:
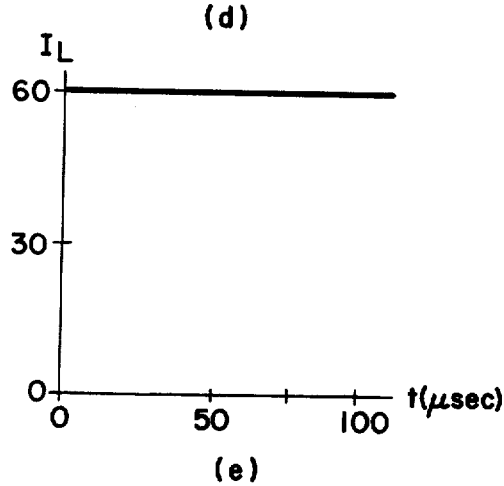
Figure 3:
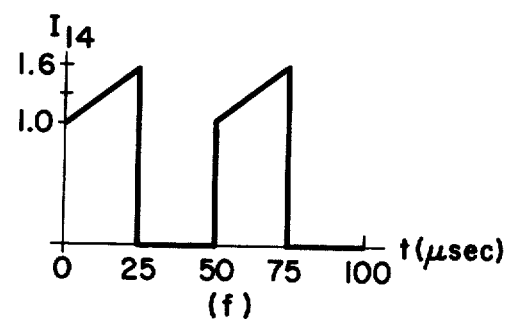
Figure 3:
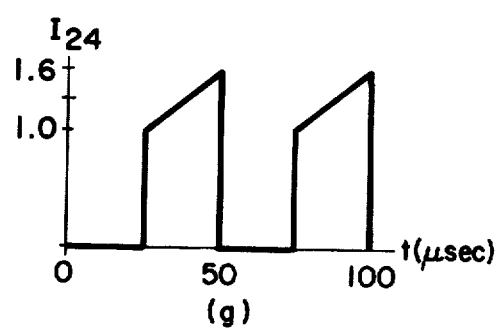
Figure 3:
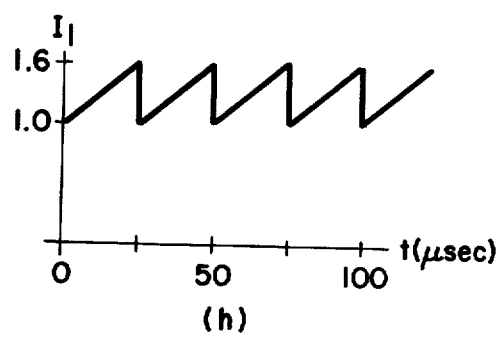
Figure 3:
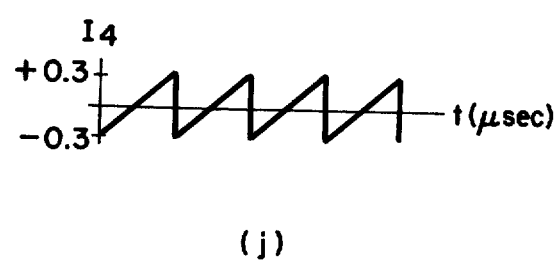

FIG. 3 illustrates some of the current and voltage waveforms present in the staggered mode DC to DC converter when $E_{IN}$ and $E_{OUT}$ are set at their nominal values. The voltage waveforms for $V_{12}$ and $V_{13}$ are shown in FIGS. 3a and 3c respectively. Notice that $V_{13}$ is identical to $V_{12}$ except that it is shifted 180° because switching transistors 14 and 24 are out of phase with respect to one another.

The current waveforms $I_{12}$ and $I_{22}$ shown in FIGS. 3b and 3d represent the current through inductors 12 and 22, respectively. Since the AC components of $I_{12}$ and $I_{22}$ are equal and of opposite polarity from one another, the resultant output current, $I_L$, is pure DC as shown in FIG. 3e and the current through capacitor 28, $I_{28}$ is zero.

The current waveforms $I_{14}$ and $I_{24}$ are shown in FIG. 3f and 3g, and their combination I, is shown in FIG. 3h. The AC component of I, is the current through capacitor 4, $I_4$. Notice that $I_4$ as shown in FIG. 3j is much less than the AC components of either $I_{14}$ or $I_{24}$. This lower AC current significantly reduces the task of the input filter which means that the size of capacitor 4 and inductor 2 can be greatly reduced. Even though the RMS value of $I_4$ increases significantly during voltage surges, the thermal time constant of capacitor 4 is much larger than the duration of a line surge. For example, in aircraft electrical systems, the quality of the power is specified by MIL-STD-704B which sets the operational voltage limits between 80 and 180 VAC. The maximum duration that the voltage can be at either extreme is 10 milliseconds. Capacitor 4 has a thermal time constant such that it can tolerate or absorb a much higher RMS ripple current for a short period of time, e.g., 10 milliseconds.

Figure 4:
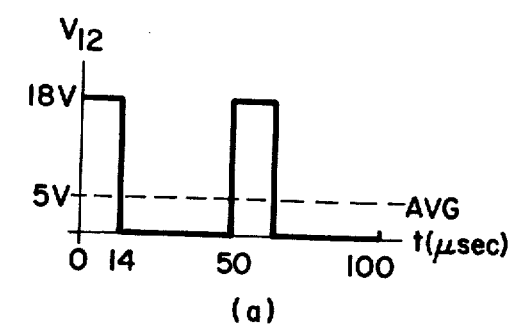
FIG. 4 illustrates some of the current and voltage waveforms present in the staggered mode DC to DC converter when $E_{IN}$ is increased to approximately 160 percent of its nominal value.
Figure 4:
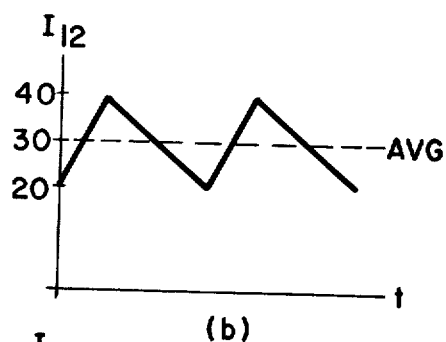
Figure 4:
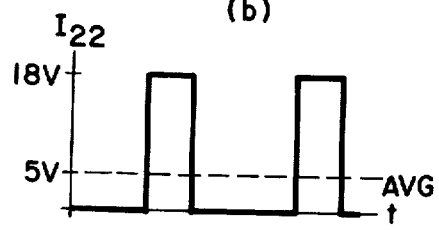
Figure 4:
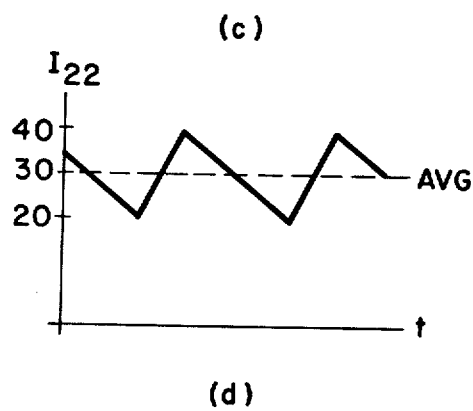
Figure 4:
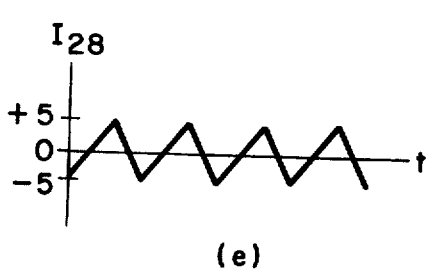

The instant invention provides for the utilization of smaller components in the input and output filters even when variations occur in the input voltage level $E_{IN}$. For example, when the input voltage $E_{IN}$ is increased to approximately 160% of its nominal value, the significant current and voltage waveforms associated with the instant invention would appear as they do in FIG. 4. Notice that the AC component of $I_L$ in FIG. 4e, $I_{28}$, has twice the frequency and approximately half the amplitude of either $I_{12}$ or $I_{22}$ as shown in FIGS. 4b and 4d. Furthermore, the present invention still provides significant improvement in the ratio of the average of the input current $I_{IN}$ to the current through capacitor 4, $I_4$. Therefore, the size, weight and cost of the input and output filters can still be significantly reduced.

A power balancing means is necessary in order to insure that the magnitude of $I_{14}$ equals that of $I_{24}$ and hence the magnitude of $I_{12}$ equals that of $I_{22}$. This is necessary in order to minimize the AC current component of $I_L$ and to balance the current and thermal stress levels in the corresponding components of the two single ended converters. The voltage developed across sense resistors 30 and 32 will be equal if $I_5$ (which is identical to $I_{12}$) is equal to $I_6$ (which is identical to $I_{22}$). If an imbalance of these currents exists the corresponding imbalance voltage will be amplified by operational amplifier 28 producing a correction voltage $V_6$ which slightly changes the duty cycle of transistor 24 with respect to transistor 14 so as to achieve balance.

Resistance 30 and 32 have equal resistance values. Resistor 34 is merely a gain setting resistor which sets the response of this integrator circuit. Capacitor 36 is the feedback capacitor for operational amplifier 28. Resistor 88 and capacitor 90 are used to smooth the voltage waveform at $V_{15}$.

The voltages across resistors 30 and 32 are also used by an overload means as they are summed by resistors 38 and 40 in order to provide overload protection. Voltage comparator 42 is utilized in order to compare voltage $V_2$ with a reference voltage $V_1$. The voltage $V_2$ is proportional to the voltages at "a" and "b" developed across resistors 30 and 32 respectively. If $V_2$ exceeds $V_1$, output voltage of comparator 42 will go to the high state.

Resistors 60 and 61 of the overload means function as a voltage divider in order to independently set the $V_1$ violtage with respect to $-V_{REF}$. Capacitor 62 is used to smooth the voltage waveform $V_2$. Diode 64 is used to couple the positive or the high state of the output from voltage comparator 42 into the R-C network comprising resistor 66 and capacitor 68.

Voltage comparator 70 compares the voltage developed across capacitor 68 to a reference voltage and should $V_3$ exceed $V_{REF}$, the output of voltage comparator 70 will go to a high voltage state. Diode 72 couples this high voltage to capacitor 74 thereby charging capacitor 74.

When $V_4$ is at this high state, resistor 78 couples this high voltage to error amplifier 76 of controller 26. The ratio of the resistive component of impedance network 98, to the value of the resistance of resistor 78 is sufficiently high so that the high state voltage at $V_4$ will cause the output of operational amplifier 76 to go to its most negative state resulting in a zero duty cycle at $V_8$ and $V_9$. During this zero duty cycle interval transistors 14 and 24 will be continuously off and the voltages at "a" and "b" developed across resistors 30 and 32 will be zero. Correspondingly, the voltage at $V_2$ will go to zero and, therefore, will be above the voltage $V_1$. This will cause the output of voltage comparator 42 to be driven to its low voltage state, allowing capacitor 68 to discharge. When the voltage $V_3$ decreases to a value below $V_{REF}$, the output of voltage comparator 70 is driven to its low voltage state, which allows the voltage $V_4$, across capacitor 74 to decay. Once $V_4$ decays to a sufficiently low value, the output of operational amplifier 76 will begin to rise. The duty cycle at $V_8$ and $V_9$ will accordingly increase slowly from zero to some larger value. As this happens the collector currents in transistors 14 and 24 will increase. Should the overload condition still exist, they will increase to a point where the voltage $V_2$ will again exceed the voltage $V_1$ and the overload means will be driven back into the overload state characterized by a zero duty at $V_8$ and $V_9$ and transistors 14 and 24 have zero currents once again. This process will repeat itself on a repetitive basis until either the overload condition is removed or the supply is manually turned off.

As previously stated both voltage comparators 42 and 70 are each followed by an RC network. The first RC network comprised of resistor 66 and capacitor 68 determines the dead time between attempted restarts. The second RC network comprised of resistor 78 and capacitor 74 determines the rate at which the supply comes up during its active portion of the overload cycle. By setting the time constant of the first RC network much longer than the time constant of the second RC network, the dead time between restart attempts will be much longer than the active portion of the restart cycle. The average value of the output current, $I_O$ can be made low simply by increasing the amount of dead time with respect to the active time. Although the peak currents of the output current will still be whatever it takes to trip the threshold at $V_2$, the average output current under short circuit conditions is substantially reduced thereby minimizing the possibility of burning out interconnection wiring without latching the power supply off or using current foldback techniques which can hang up under certain load conditions.

In an effort to present typical component values for the instant invention and elucidate upon the design philosophy, the steps necessary to design a power supply to meet the requirements of a specification such as Military Specification MIL-STD 704B will be described. It will be assumed that the power supply will be operating at 20K Hertz and have an output voltage, $E_{OUT}$, equal to 5 volts DC and an output current $I_0$ equal to 60 amps. Furthermore, the supply shall have a maximum output ripple voltage of 0.1 volt peak to peak, a nominal efficiency of 80% and an operating temperature range of $-55°$ C. to $+55°$ C. With the three phase voltage at its nominal value of 113 VAC, the input voltage, $E_{IN}$, would be equal to 270 volts DC. Since the staggered mode DC to DC converter is to operate at a 50% duty cycle (the optimum operating point for this invention), the turns ratio for transformers 6 and 16 must be equal to $E_{IN}/(E_{OUT}/0.5+0.75)$ or 23:1. The 0.75 volts used in the aforementioned equation represents the rectifier and copper losses. The variation in the current $I_{12}$ as shown in FIG. 3b is chosen to be approximately 50% of the average value of $I_{12}$ or 14 amps. The value of inductor 12 necessary to achieve this is equal to (5 volts) (25 microseconds)/14 amps or 9 microhenries. The 25 microseconds represent a half period because the supply is operating at 20K Hertz and at a 50% duty cycle. Inductor 22 will have the same value as inductor 12. For the first 25 microseconds ($0<t<25$ microseconds), $V_{12}$ is positive and transistor 14 and diode 8 are conducting. Diode 10 is reverse biased, hence nonconducting. Therefore, the current through diode 8 and, hence the secondary of transformer 6 is equal to $I_{12}$. The primary current, $I_{14}$ of transformer 6 is therefore $I_{12}/23$, where 23 is the primary to secondary turns ratio. During the second 25 microseconds ($25<t<50$ microseconds), diode 8 is reversed biased and $I_{12}$ flows through diode 10. Not shown is a reset circuit that resets transformer 6 to minus $B_{max}$ during the off period of transistor 14. The operation of transformer 16 and its associated components are the same as transformer 6 except of a displacement in time of a half period.

The RMS value of $I_4$ shown in FIG. 3j is approximately 0.2 amperes. This means that capacitor 4 can be realized by combining only two M39018/1A-0774 capacitors (series connected to achieve necessary voltage rating) to handle the 0.2 amp RMS ripple current.

When the avionic input line voltage is at its high level of 180 volts AC (line to neutral), $E_{IN}$ will be 430 volts DC and the duty cycle of the supply will be 28% calculated from the following relationship:

$$\text{Duty Cycle} = \frac{E_{OUT}}{E_{IN}(\text{turns ratio}) - .75}$$

For this condition, the current through capacitor 28, $I_{28}$, will be approximately 10 amperes, peak to peak (FIG. 4e). Solid tantalum capacitor (such as M39003/03) are generally selected for the output capacitor because they maintain a low equivalent series resistance, ESR, (0.1 ohms for a 15 volt, 330 microfarad unit) at $-55°$ C. In order to comply with a 0.1 volt peak to peak ripple voltage, the ESR of capacitor 28 cannot exceed 0.01 ohm. Hence ten M39003/03-0145 capacitors in parallel are required to perform the function of capacitor 28.

Figure 5:
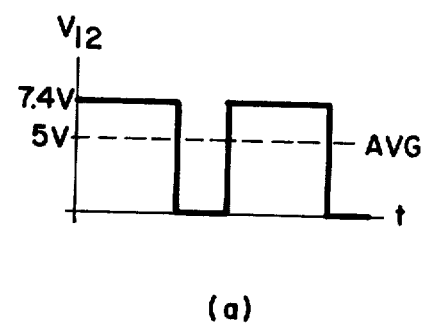
FIG. 5 illustrates some of the current and voltage waveforms present in the staggered mode DC to DC converter when $E_{IN}$ is decreased to approximately 70 percent of its nominal value.
Figure 5:
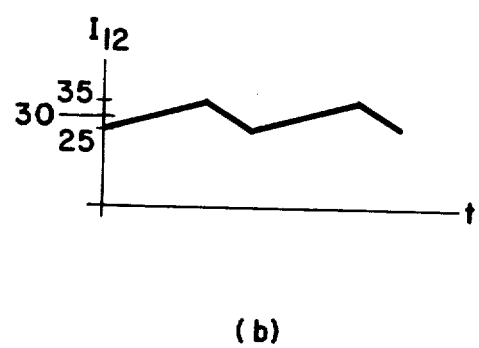
Figure 5:
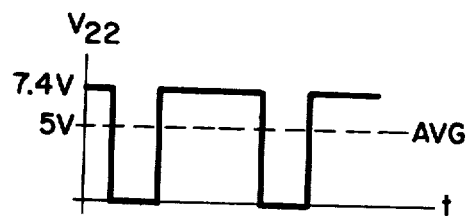
Figure 5:
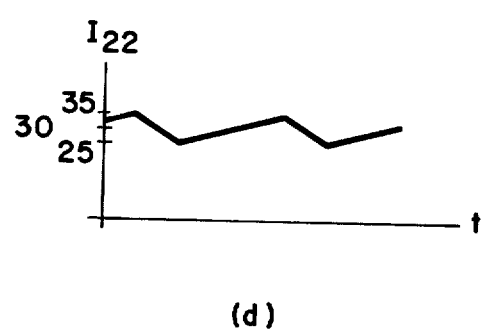
Figure 5:
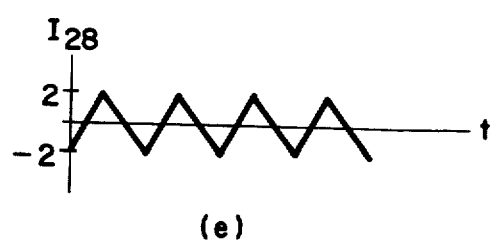

When the avionic input line is at its low level of 80 volts ac, the duty cycle of the converter will be 68% and as can be seen in FIG. 5 the current through capacitor 28, $I_{28}$, will be approximately 4 amperes peak to peak, corresponding to an output ripple of 0.04 volts peak to peak.

Avionic power supplies according to the aforementioned design have been built to achieve better than 5.5 watts per cubic inch, 100 watts per pound and 80% efficiency at full load over an input voltage range of 90 VAC to 180 VAC.

One disadvantage of a single ended converter as compared to a full bridge circuit is that the switching transistors must have a higher $V_{CEX}$ rating. When $E_{IN}=430$ the duty cycle is 28% and the reset voltage referred to the primary of the power transformer must be at least 430 (28/72)=111 volts. Thus the $V_{CE}$ at high line will be at least 541 volts. In a practical case the actual $V_{CE}$ will have a maximum value of 650 to 750 volts depending on the speed of the servo loop. However, only the first 430 volts of the $V_{CE}$ voltage swing are under load since the catch diode will provide the output current when the polarity of the transformer reverses. Hence, both the bridge converter and the single ended converter have the same $V_{CEX}$(SUS). However, the $V_{CEX}$ rating for the bridge converter and the single-ended converter are 430 and 750 volts, respectively. A transistor that has a $V_{CEX}$ (SUS) of 430 volts will typically have a $V_{CEX}$ in the range of 600 to 800 volts and the higher $V_{CEX}$ requirement of the single ended converter is of little consequence.

In determining the maximum $V_{CEX}$ (SUS) for the transistor in the bridge converter it was assumed that one of the two conducting transistors could turn off before the other causing the full input voltage to be dropped across a single transistor.

In each single ended converter, the transformer is reset by a reset winding (not shown in FIG. 1) in order to reset the flux density of each transformer to $-B_{Sat}$ during the time that each switching transistor is turned off. This results in swinging the flux density from $-B_{Sat}$ to $+B_{max}$. $-B_{SAT}$ is the saturation flux density in the negative (Third Quadrant) direction and $B_{max}$ is the highest positive value the flux density experienced during normal operation. No capacitor is necessary to balance the flux swing as is required in a power supply utilizing a bridge circuit. In a prior art bridge circuit supply an unbalance current can build up due to an average voltage across the primary of the power transformer. This can significantly reduce the available flux swing. In such systems a capacitor is inserted in series with the primary in order to insure that no average current can flow through the primary which would cause a DC flux bias. Since the capacitor must be bipolar and capable of handling the same RMS current that flows through the input capacitor it must be large in size and costly.

Bridge circuits operating at nominal input voltages have their one transformer operating with a conduction angle of approximately 63% for its primary and 31.5% for the secondaries.

The conduction angles of the primary and secondary (at nominal input voltage) are both 50% for the instant staggered mode power supply. This offers a slight average from a copper utilization standpoint. Therefore, by swinging to a slightly higher flux density and having a slightly higher utilization of the copper, the combined size and weight of the two 150 watt transformers 6 and 16 will be somewhat smaller than the one 300 watt transformer required in a comparable bridge circuit power supply.

Furthermore, using prior art design techniques, such as that described in TRW Power Semiconductors Application Note No. 122A (2/76), a five volt prior art power supply would require much larger capacitors in the input and output filters, for a given load current.

While a preferred embodiment of the invention has been shown and described, various other embodiments and modifications thereof will become apparent to persons skilled in the art, and will fall within the scope of invention as defined in the following claims. In higher output current version it may be desirable to use pulse transformers to sample the primary currents of transformers 6 and 16 instead of using resistors that must conduct the output current in order to perform the current balance and overload protection functions.

Figure 6:
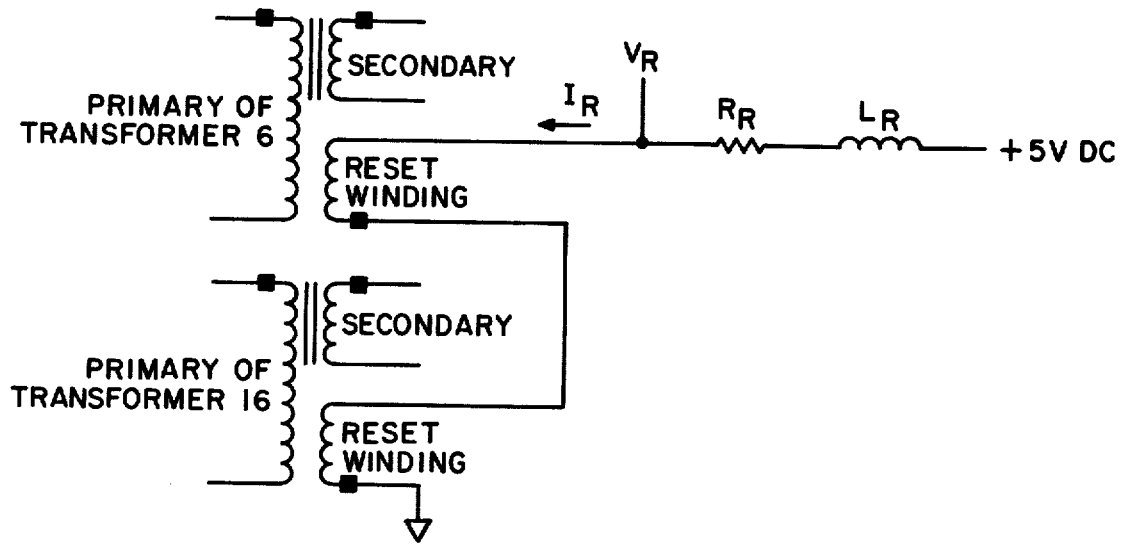
FIG. 6 is a schematic diagram of a reset circuit which could be used with the instant invention.

One technique for resetting the power transformer is to add a reset winding to each transformer, and connect the reset windings in a series aiding configuration as shown in FIG. 6. A small choke and a resistor are used to maintain a constant current through the reset windings. Since the transformers are operating out of phase, $V_R$ is small compared to the output voltage of each reset winding thus making the task of $L_R$ much easier. $R_R$ sets the value of the reset current, $I_R$, and $L_R$ minimizes variations in $I_R$ due to overlap (duty cycle greater than 50%), underlap (duty cycle less than 50%) and saturation (at $B_{SAT}$) of the power transformers at the end of reset period. The reset power is approximately one watt for a 300 watt supply.

What is claimed as new and desired to be secured by Letters Patent of the United States is:

1. A staggered mode DC to DC voltage converter for converting an input DC signal subject to voltage variations to a regulated output DC voltage comprising:
    an input filter consisting of a first inductor and first capacitor connected in series, having said input DC signal applied across said inductor and capacitor;
    a first single ended converter having a first and second input terminal, said first input terminal being connected to said input filter at a point located between said first inductor and said first capacitor, and said second input terminal being connected to a first switching means so as to switch said first single ended converter to a conducting or nonconducting state at specific times, said first single ended converter further comprising a first transformer means whose output current is first rectified by a first rectification means being connected to both ends of said first transformer means and then averaged by a first averaging means to yield a first average current;
    a second single ended converter having a first and second input terminal, said first input terminal being connected to said input filter at a point located between said first inductor and said first capacitor, and said second input terminal being connected to a second switching means so as to switch said second single ended converter to a conducting and nonconducting state at specific times, said second single ended converter further comprising a second transformer means whose output current is first rectified by a second rectification means being connected to both ends of said second transformer means and then averaged by a second averaging means to yield a second averaged current;
    a control means having a first and second output terminal connected to said first and second switching means to switch said second single ended converter to a conducting or nonconducting state at specific times when said first single ended converter is switched to a nonconducting or conducting state respectively;
    an output filter having a first and second terminal, said first terminal being connected to said first and said second single ended converters to accept the d.c. and a.c. components of said first and second averaged current, said a.c. currents being out of phase with one another combining so as to reduce the ripple current in said output, said first terminal of said output filter being connected to a first input terminal of said control means; and
    a power balancing means for equally balancing the power between said first and second single ended converters and providing a balance signal to said control means to adjust the specific times that said first and second switching means are turned on and off.

2. The staggered mode DC to DC converter set forth in claim 1 further comprising an overload means having one end connected to said first single ended converter to sense a first voltage proportional to a first averaged current and having a second end connected to said second single ended converter to sense a second voltage proportional to a second averaged current so that said control means can turn off said DC to DC converter in the event an overload conditions arises.

3. The voltage converter set forth in claim 1 wherein said first single ended converter comprises:
    a first single ended power transformer, having the start end of its primary winding connected to said first input terminal of said first single ended converter and having the other end of its primary winding connected to said second input terminal of said first single ended converter;
    a first diode element whose anode end is connected to the start end of the secondary winding of said first single ended power transformer;
    a second diode element whose cathode end is connected to the cathode end of said first diode element and whose anode end is connected to the other end of the secondary winding of said first single ended power transformer;
    a second inductor whose first end is connected to the cathode end of said second diode element and whose second end is connected to said first input terminal of said output filter; and
    a first resistor, having one end connected to the anode end of the second diode and having the other end connected to the said second input terminal of said output filter.

4. The voltage converter set forth in claim 3 wherein said second single ended converter comprises:
    a second single ended power transformer, having the start end of its primary winding connected to said first input terminal of said second single ended converter and having the other end of its primary winding connected to said second input terminal of said second single ended converter;
    a third diode element whose anode end is connected to the start end of the secondary winding of said second single ended power transformer;
    a fourth diode element whose cathode end is connected to the cathode end of said third diode element and whose anode end is connected to the other end of the secondary winding of said second single ended power transformer;

a third inductor whose first end is connected to the cathode end of said fourth diode element and whose second end is connected to said first input terminal of said output filter; and a second resistor, having one end connected to the anode end of the fourth diode and having the other end connected to the said second input terminal of said output filter.

5. The voltage converter set forth in claim 3 wherein said first switching means comprises a first transistor having a collector, base and emitter terminal said collector terminal being connected to said other end of said primary winding of said first single ended power transformer, said base terminal being connected to said first output of said control means, and said emitter terminal being connected to the first capacitor of the input filter at its end opposite to said first inductor.

6. The voltage converter set forth in claim 5 wherein said second switching means comprises a second transistor having a second collector, a second base and a second emitter terminal, said second collector terminal being connected to said other end of said primary winding of said second single ended power transformer, said second base terminal being connected to said second output of said control means, and said second emitter terminal being connected to the capacitor of the input filter at its end opposite to said first inductor.

7. The voltage converter set forth in claim 6 wherein said power balancing means further comprises:

a third resistor connected at its first end to the anode end of said second diode element;

a fourth resistor connected at its first end to the anode end of said fourth diode element;

a second capacitor connected at its first end to the second end of said fourth resistor and connected at its second end to a ground terminal;

a first operational amplifier having a positive and negative input terminal and an output terminal, said positive input terminal connected to said second end of said fourth resistor, and said negative input terminal being connected to said second end of said third resistor;

a third capacitor having its first end connected to said negative input terminal and having its second end connected to said output terminal of said first operational amplifier.

8. The voltage converter set forth in claim 7 wherein said control means further includes:

a first impedance network having a first and second end, said first end being connected to said first terminal of said output filter;

a second operational amplifier having a positive and negative input terminal and an output terminal, said positive input terminal being connected to a reference voltage level, and said negative input terminal being connected to said second end of said first impedance network;

a second impedance network having a first and second end, said first end being connected to said negative input terminal of said second operational amplifier and said second end being connected to said output of said second operational amplifier;

a fifth resistor having its first end connected to the output terminal of said first operational amplifier;

a sixth resistor having its first end connected to the output terminal of said second operational amplifier and having its second end connected to the opposite end of said fifth resistor;

a two phase oscillator having a first and a second output terminal, said second output terminal producing an electrical waveform with the same amplitude but 180° out of phase with respect to an electrical waveform present at the same time at said first output terminal;

a first voltage comparator having a positive and a negative input terminal and an output terminal, said positive input terminal being connected to said second end of said sixth resistor, and said negative input terminal being connected to said second output terminal of said two phase oscillator;

a first voltage driver having an input terminal and a first and second output terminal, said input terminal being connected to said output terminal of said first voltage comparator;

a third single ended power transformer having each end of its primary winding connected to each of said first and second output terminals of said first voltage driver, respectively, and having one end of its secondary winding connected to the base terminal of said second transistor, and having the other end of its secondary winding connected to the emitter terminal of said second transistor;

a second voltage comparator having a positive and a negative input terminal and an output terminal, said positive input terminal being connected to said output of said second operational amplifier, and said negative input terminal being connected to said first output terminal of said two phase oscillator;

a second voltage driver having an input terminal and a first and second output terminal, said input terminal being connected to said output terminal of said second voltage comparator;

a fourth single ended power transformer having each end of its primary winding connected to each of said first and second output terminals of said second voltage driver, respectively, and having one end of its secondary winding connected to the base terminal of said first transistor; and having the other end of its secondary winding connected to the emitter terminal of said first transistor.

9. The voltage converter set forth in claim 8 wherein said overload means further includes:

a seventh resistor having a first and second end, said first end being connected to a negative reference voltage;

an eighth resistor having a first and second end, said first end being connected to said second end of said seventh resistor and said second end being connected to a ground terminal;

a ninth resistor having a first and a second end, said first end being connected to the anode end of said second diode element;

a tenth resistor having a first and a second end, said first end being connected to the anode end of said fourth diode element and said second end being connected to said second end of said ninth resistor;

a fourth capacitor having a first and a second end, said first end being connected to said second end of said tenth resistor, and said second end being connected to a ground terminal;

a third voltage comparator having a positive and a negative input terminal and an output terminal, said positive input terminal being connected to said second end of said seventh resistor, and said negative input terminal being connected to said second end of said ninth resistor.

a fifth diode element having its anode end connected to the output terminal of said third voltage comparator;

an eleventh resistor having a first and a second end, said first end being connected to the cathode end of said fifth diode element, and said second end being connected to a grounded terminal;

a fifth capacitor having a first and a second end, said first end being connected to said first end of said eleventh resistor, said second end being connected to a ground terminal;

a fourth voltage comparator having a positive and a negative input terminal and an output terminal, said positive input terminal being connected to said first end of said fifth capacitor, and said negative input terminal being connected to a positive reference voltage;

a sixth diode element having its anode end connected to the output terminal of said fourth voltage comparator;

a twelfth resistor having a first and a second end, said first end being connected to the cathode end of said sixth diode element, and said second end being connected to the negative input terminal of said second operational amplifier;

a sixth capacitor having a first and a second end, said first end being connected to the cathode end of said sixth diode element, and said second end being connected to a ground terminal.

* * * * *